May 2, 1939.　　　　W. E. MOLINS　　　　2,156,600
MANUFACTURE OF CIGARETTES
Filed Sept. 14, 1934　　10 Sheets-Sheet 1

Inventor
Walter E. Molins

May 2, 1939.  W. E. MOLINS  2,156,600
MANUFACTURE OF CIGARETTES
Filed Sept. 14, 1934  10 Sheets-Sheet 2

Inventor
Walter E. Molins.
By Watson, Coit, Morse & Grindle
ATTYS.

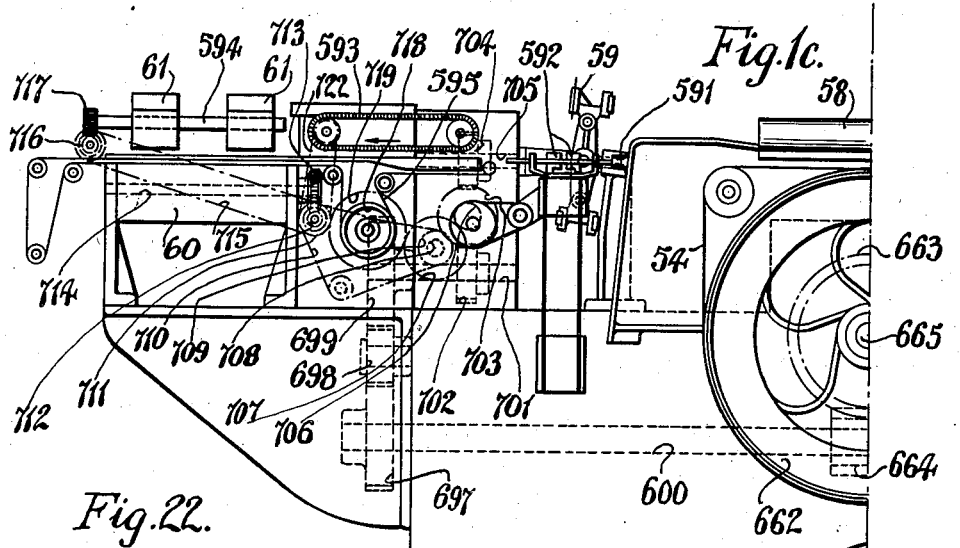

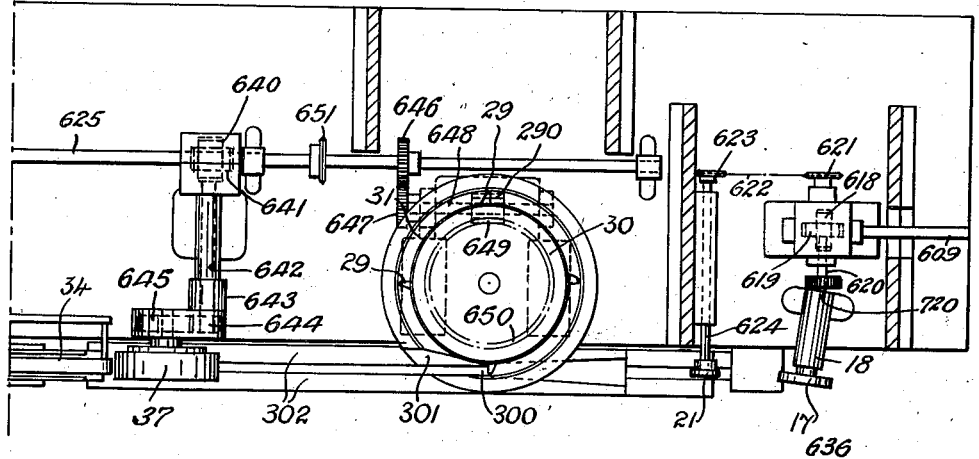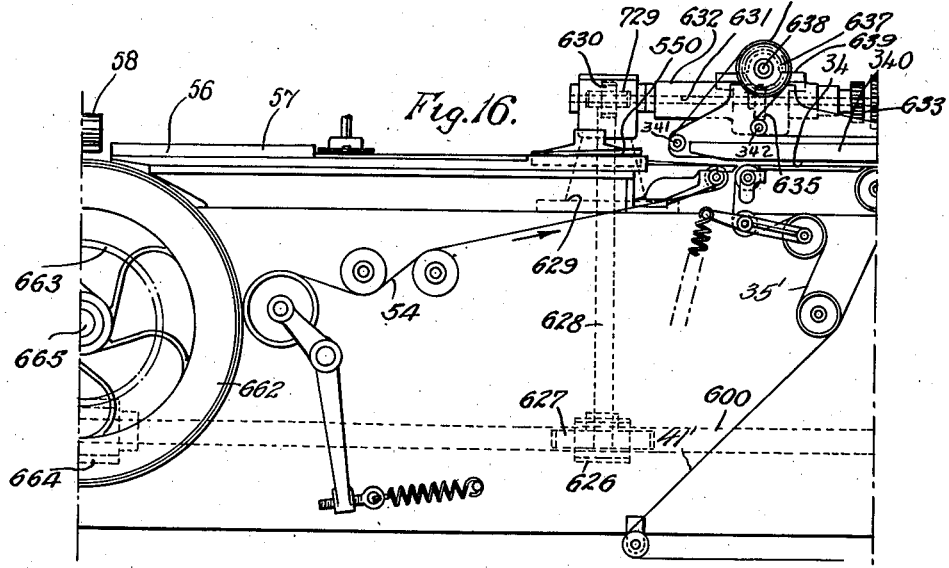

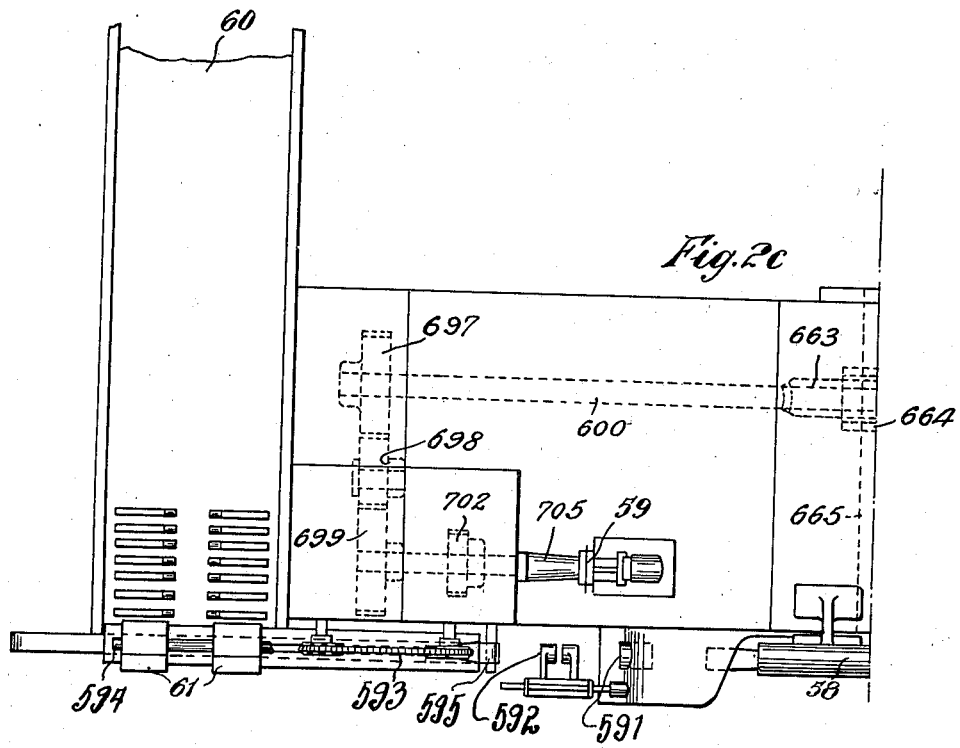

May 2, 1939. W. E. MOLINS 2,156,600
MANUFACTURE OF CIGARETTES
Filed Sept. 14, 1934 10 Sheets-Sheet 6

INVENTOR
W. E. Molins
By Watson, Coit, Morse & Grindle
Attorneys.

May 2, 1939.    W. E. MOLINS    2,156,600
MANUFACTURE OF CIGARETTES
Filed Sept. 14, 1934    10 Sheets-Sheet 7
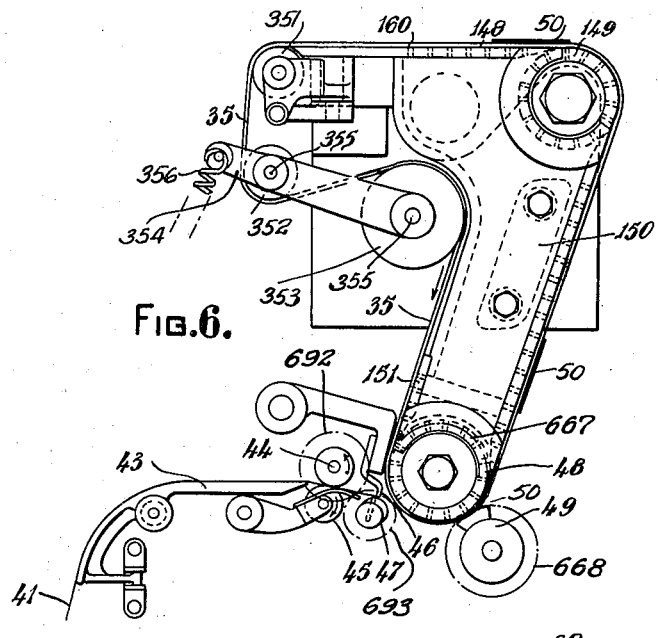
FIG.6.
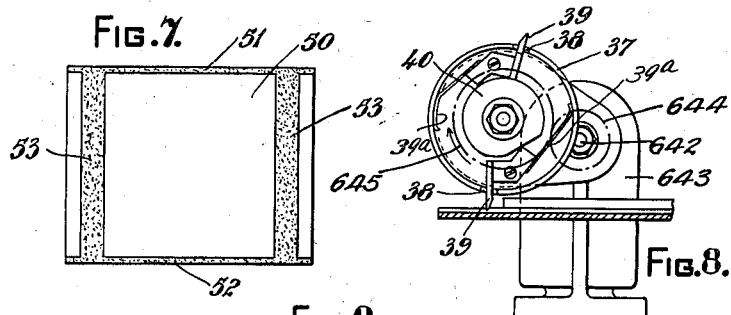
FIG.7.   FIG.8.
FIG.9.
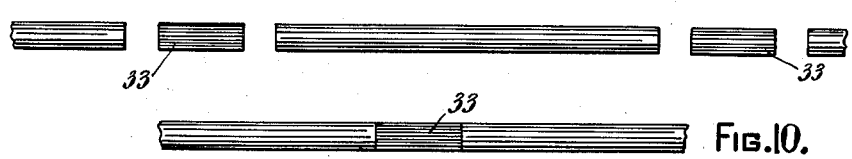
FIG.10.
FIG.11.
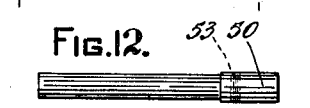 
FIG.12.    FIG.13.

Patented May 2, 1939

2,156,600

UNITED STATES PATENT OFFICE 2,156,600

MANUFACTURE OF CIGARETTES

Walter Everett Molins, Deptford, London, England; Harold Bernardo Molins and Moses Hymen Isaacs, executors of said Walter Everett Molins, deceased, assignors to Molins Machine Company Limited, London, England Application September 14, 1934, Serial No. 744,053
In Great Britain September 21, 1933

66 Claims. (Cl. 131—39)

This invention is for improvements in or relating to the manufacture of cigarettes, and refers more particularly to a method of and a machine for making cigarettes, provided with filter plugs, mouthpieces and the like. It has for its principal object to provide a new method of performing this operation, and a machine for producing mouthpiece cigarettes.

Another object is the provision of a novel method and mechanism for severing short lengths from a continuous web of wrapping or tipping material and feeding them into engagement with the cigarette elements with which they are to be associated. A further object is the provision of a method and mechanism for forming mouthpiece cigarettes in which a length of cigarette rod and a filter plug or stub are assembled and encompassed by a strip of wrapping or tipping material which is secured to the cigarette and/or the stub by means of an adhesive.

A further object is the provision of novel mechanisms for performing the several steps of the method hereinafter described and claimed, and performing similar functions in analogous operations.

Cigarettes are often provided with plugs which usually form a filter for the smoke or serve to modify the flavor of the tobacco, or in some cases tube mouthpieces are employed which may be empty or filled entirely or partly with filtering or flavoring material, and the invention may be used to unite all such articles to the ends of cigarettes, but for the sake of brevity the term "stubs" is used throughout the specification and is deemed to include all such articles.

The term "stub" shall also be deemed to include a mouthpiece constituted in part by a length of tobacco filler, and in part by a length of filter or flavoring material, or a tubular piece either hollow or entirely filled or partly filled with filter or flavoring material. The term "stub" shall also be deemed to include a mouthpiece containing a length of tobacco filler which is of a different kind of tobacco from that forming the main body of the cigarette.

Cigarettes provided with stubs will, for convenience, be referred to hereinafter and in the appended claims as mouthpiece cigarettes.

According to the present invention there is provided a method of manufacturing mouthpiece cigarettes according to which a stub and a cigarette are brought into axial alignment, and if necessary, into contact with one another, moving the stub and cigarette axially, and while they are so moving in an axial direction, folding or wrapping and securing a wrapper or a narrow strip of material (for example, a length of tip material) around the stub and cigarette to unite them.

Preferably two cigarettes with a double length stub between them are united by a wrapper or a narrow strip of material, and the composite article is thereafter cut in the middle of the stub to produce two mouthpiece cigarettes.

The cigarettes themselves may be of double length and have double length stubs secured to both ends, and the composite article may be then cut in the middle of the cigarette lengths, and also in the middle of the stub lengths to produce mouthpiece cigarettes.

The invention will now be described with reference to the accompanying drawings, in which Figures 1a, 1b and 1c taken together, comprise a side elevation of the machine for assembling mouthpiece cigarettes from lengths of stub material and preformed cigarettes;

Figures 2a, 2b and 2c, taken together, comprise a plan view of the machine shown in Figures 1a, 1b and 1c, the hoppers for feeding the cigarettes and stubs being removed;

Figure 6 is an enlarged view of that part of the machine in Figure 1a, in which lengths of strip material are provided with adhesive and fed to the stubs and cigarettes;

Figure 7 is an enlarged view of a length of tip material showing the manner in which this is gummed by the apparatus shown in Figure 6;

Figure 8 is a detail of a device for pressing the cigarettes and the stub material together in an axial direction;

Figures 9, 10 and 11 illustrate how a composite endless rod consisting in alternating sections of cigarette and stub are brought together and secured to form an endless composite rod, and also show the positions in which the rod is cut to produce mouthpiece cigarettes;

Figure 12 illustrates a mouthpiece cigarette, as produced on the machine;

Figure 13 shows the manner in which a length of stub material is cut on the stub feeding mechanism, shown in Figures 1a and 4, into three double length stubs;

Figure 14 illustrates the manner in which single cigarette lengths and single stub lengths may be fed axially and joined, so that no severing operation is necessary;

Figure 15 illustrates the manner in which pairs of single length cigarettes may be fed alternately with double length stubs, for forming units of two cigarettes joined by a single double length stub, requiring the stub to be later severed;

Figure 16 illustrates a modified form of the apparatus of Figure 1b, in accordance with which a continuous strip of wrapping material is fed to the cigarettes and stubs.

Figure 19 shows a portion of the interior of the machine bed illustrating the gearing for driving the mechanism for feeding and gumming the tip material. The view is taken in the opposite direction to that of Figure 6.

Figure 22 is a view looking in the direction of the arrow Z, Figure 19 and shows the relative positions of the various shafts.

Like reference numerals refer to like parts throughout the several figures of the drawings.

Figure 1A:
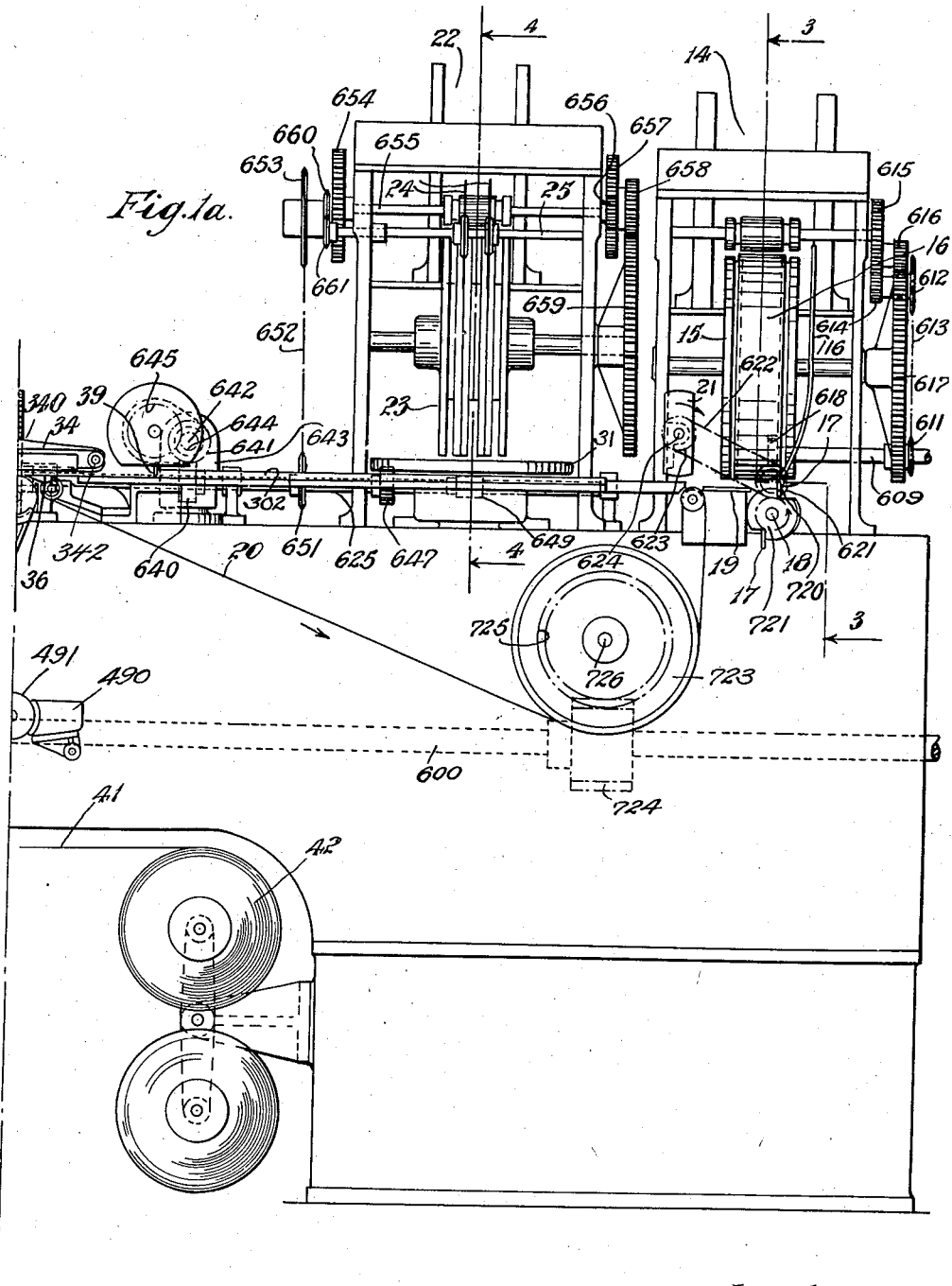
Figure 3:
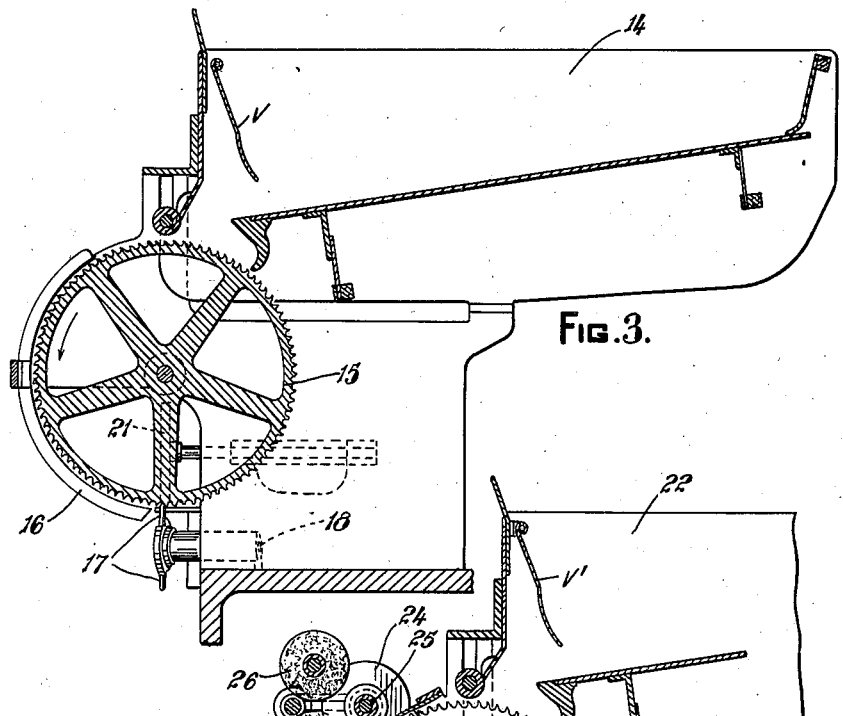
Figure 3 is a sectional elevation to an enlarged scale along the line 3—3 of Figure 1a, looking in the direction of the arrows.

Referring to Figures 1a and 3, cigarettes are placed in a hopper 14 and are fed downwardly by a fluted roller 15 moving in an anti-clockwise direction. The pivoted vane V is provided in order to regulate the flow of cigarettes from the hopper 14 to the drum 15, in a manner well known. A shield 16 is provided along a part of the periphery of the roller 15 to prevent the cigarettes from falling off the roller before it is time for them to do so. As the cigarettes reach the end of the shield 16 they are removed from the flutes by vanes 17 rotatably driven in an anti-clockwise direction on a shaft 18. In order to bring the ends of the cigarettes into position to be engaged by the vanes 17, a guide 116 is provided to move the cigarettes axially in the flutes of the roller 15. The shaft 18 is set slightly askew so that as the roller 15 continues to move, a vane 17 which is acting on cigarettes in one of the flutes, will follow the movement of the flute and so avoid damaging either the cigarettes or the flutes.

The cigarettes are in this manner removed from the drum 15 and are delivered over a platform 19 onto an endless tape 20.

A rotating feed member 21 having a peripheral velocity which is in excess of that of the tape 20 or the vanes 17, feeds the cigarettes in the direction of their longitudinal axes on the tape and in such a manner that spaces are left between successive cigarettes. The cigarettes are thereafter moved along on the tape 20, maintaining their spaced relationship, and double length stubs are fed by stub feeding mechanism shown in Figures 1a, 2a, 4 and 5 into the spaces left between the cigarettes.

Figure 4:
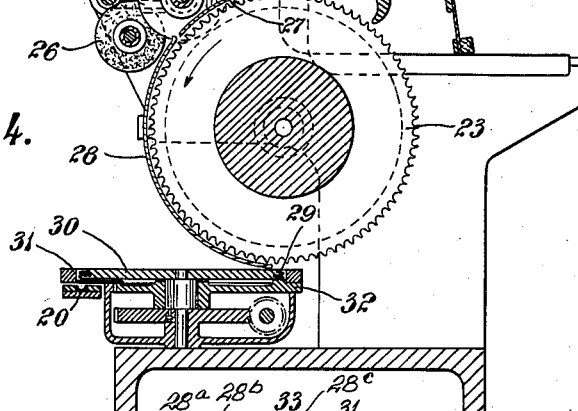
Figure 4 is a sectional elevation along the line 4—4 of Figure 1a, looking in the direction of the arrows.

The stub feeding mechanism comprises a hopper 22, in which comparatively long lengths of stub material are contained. The pivoted vane V' serves to regulate the flow of stub material from the hopper 22. As shown in Figure 13, these comparatively long lengths of stub material are to be divided into three double length stubs. The long length of stub material, therefore, leaves the hopper 22 and falls into the flutes on a drum 23. The drum is divided, as can be seen in Figures 1a and 4 to enable knives 24 to sever the comparatively long stubs into three double length sections. The knives 24 are circular rotating knives mounted on fixed axes 25 and grinders 26 are provided to sharpen both sides of the knives.

Shields 27 and 28 hold the stubs in the flutes of the drum 23 until it is time for the stubs to be released, such shields being shown in Figure 4, but being omitted from Figure 1a for the sake of clarity.

Figure 5:
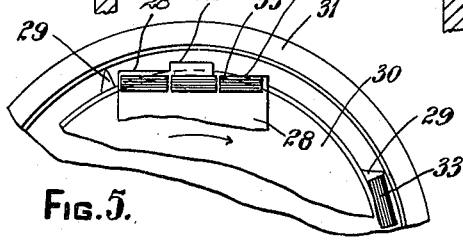
Figure 5 is an enlarged plan view of a portion of the stub feeding mechanism shown in Figure 4.

As will be seen in Figure 5, the lower end of the shield 28 is stepped as indicated at 28a, 28b and 28c. The reason for this will be seen later.

The double length stubs are to be fed downwardly between pusher pieces 29 at the point 290 of an endless conveyor 30 in the form of a rotatable wheel moving in a clockwise direction. The conveyor 30 is rotated by suitable gearing as described later, and is driven synchronously with the conveyor tape 20 so that plugs can be fed downwardly between successive cigarettes on the tape 20 and placed in a proper position.

Referring again to Figures 4 and 5, it will be seen that the conveyor 30 is provided with an annular space between it and an outer wall 31. The wall 31 is carried on a stationary supporting plate 32. This plate 32 forms a bottom to the space between the conveyor 30 and the rim 31, except at a point 300 directly above that along which the cigarettes pass. At this point the bottom of the plate is cut away as also the wall 31, see Figure 2a, and a plate 301 is provided to guide the stubs out of the space. The drum 23 and the conveyor 30 are so timed that while one flute is passing over the space between the conveyor 30 and the outer ring 31, three pusher pieces 29 will move past the lower end of the shield 28.

As has been previously mentioned, the lower end of the shield 28 is stepped. In this way, as the stubs 33 reach the lower end of the shield 28, the right hand stub 33 will be the first to fall out of a flute into the annular ring between the conveyor 30 and the guide ring 31.

As has been stated above, the speed of the conveyor 30 is such that three pushers 29 will pass the lower end of the plate 28 while one flute in the drum 23 is moving across the annular trough. Therefore, after the right-hand stub 33 falls between two pusher pieces 29, the conveyor 30 rotates so that by the time the extreme left stub 33 falls out of a flute, it will fall in the annular trough behind the pusher piece which is carrying the extreme right-hand stub 33 along. Then in like manner the last and middle stub 33 will fall into the third successive pocket in the trough formed between the conveyor 30 and the ring 31. In this way, one double length stub is carried round by a pusher 29 on the endless conveyor 30, and owing to the ring 31, the stubs remain in the trough.

As has been previously stated, however, the supporting plate 32 is cut away just above the tape 20 and in this manner the double length stubs drop onto the tape 20 at the moment that they are moving in the same direction as the tape 20.

The conveyor 30 is so timed that one pusher piece 29 carries a stub to the point of release, and so enables the stub to drop onto the tape 20 between two successive cigarettes. In this way the conveyor tape 20 then carries alternate cigarettes and stubs, the longitudinal axes of which are in alignment, to the conveyor tapes 34 and 35, which are driven at a slower speed than the tape 20 if it is necessary to bring the cigarettes and stubs into contact. The conveyor tape 34 which passes beneath a concave guide 340 is driven from a pulley 636 and passes over rollers 341, 342 and 343, journalled on studs supported by a frame 344. The tape 35 passes over rollers 48, 149, 351 (Fig. 6) and 352, and is tensioned by a roller 353. The rollers 48, 149, 351 and 352 are journalled upon studs supported by a suction box 150, and the roller 353 is journalled upon a stud supported by the arm 354 pivoted at 355, the tension being applied by a spring 356. The roller 149 is driven at such speed as hereinafter described as will cause the tape 35 to have the same linear speed as tape 34.

The stubs and cigarettes are delivered from the tape 20 to the conveyor tapes 34, 35. A stationary bridge piece 36 is provided between the tapes 20 and 35 and the tape 34 extends over the bridge piece 36 and part of the tape 20; thus the tape 34 moves cigarettes and stubs positively over the bridge piece.

A driving mechanism, shown more clearly in Figure 8, is provided for positively moving cigarettes towards the conveyor tapes 34, 35, and ensures that the ends of the cigarettes are in correct spaced relationship when engaged by the conveyor mechanism 34, 35.

This positive driving mechanism comprises a rotating drum 37 with two apertures 38 in its cylindrical surface. Mounted on an annular flange in the drum are two spring urged pivoted fingers 39, the springs being indicated at 39a. The fingers 39 move faster than the conveyors 34 and 35 and are arranged as cam followers on a stationary cam 40 and the cam is so shaped that as the fingers 39 are moving along the tape, that is to say, when they are in engagement with cigarettes, the driving face of each finger 39 remains perpendicular so long as it is in engagement with the end of a cigarette.

In this way the cigarettes and plugs are brought into proper spaced relationship by the fingers 39 without damaging the ends of the cigarettes.

As will be seen more clearly in Figure 6, wrapping material for wrapping round the ends of adjacent stubs and cigarettes is fed to the tape 35. The wrapping material 41, in the present case, tipping material, is fed from a supply spool 42, shown in Figure 1a, over a stationary plate 43 and between driving rollers 44 and 45. Strips or tips 50 are severed from the continuous length of wrapping material by an oscillating knife 46 which works in timed relationship with the rotating knife edge 47. The severed length of tip material 50 is then moved along a perforated roller 48 around which the endless belt 35 travels. Gum is applied to the severed tip material 50 by a roller 49 of any convenient and known design from a gum pot 490 through rollers 491 and 492.

The web 41 of tipping material is, of course, fed at a lower linear speed than that of the tape 35, on which the cigarettes and stubs are advancing. As each tip 50 is severed, it is gripped against the tape 35 and accelerated accordingly, thus spacing the tips the required distance apart.

The tape 35 is perforated or porous and the tips 50 are held onto the tape by suction from the time they reach the roller 48 until they reach a point 160 about halfway along the shield 148. The roller 149 is also perforated and the suction is applied from the inside of the box 150 to the tape 35 between the shield 151 and the shield 148. Thus the tips 50 are released from the tape 35 when they are in proper relation to the cigarettes and stubs.

The cigarettes having previously been properly spaced by the fingers 39, it will be seen that the tip overlaps the end of each cigarette by an equal amount.

The gum roller 49 may be arranged so that it gums the strip of wrapping material 50 in the manner shown by the stippling in Figure 7.

In Figure 7, the gum lines 51 and 52 are the edges which are parallel to the axis of the cigarettes and stubs and these lines serve to secure first one longitudinal edge of the tip to the stub and to the ends of the cigarettes while the other gum line secures the other longitudinal edge of the tip to form the seal.

The gum lines 53 may be spaced apart, as shown in Figure 11 for the case where the cigarettes and stubs are in endwise engagement so that the junction between a stub and a cigarette lies in the middle of each gum line.

Figure 1B:
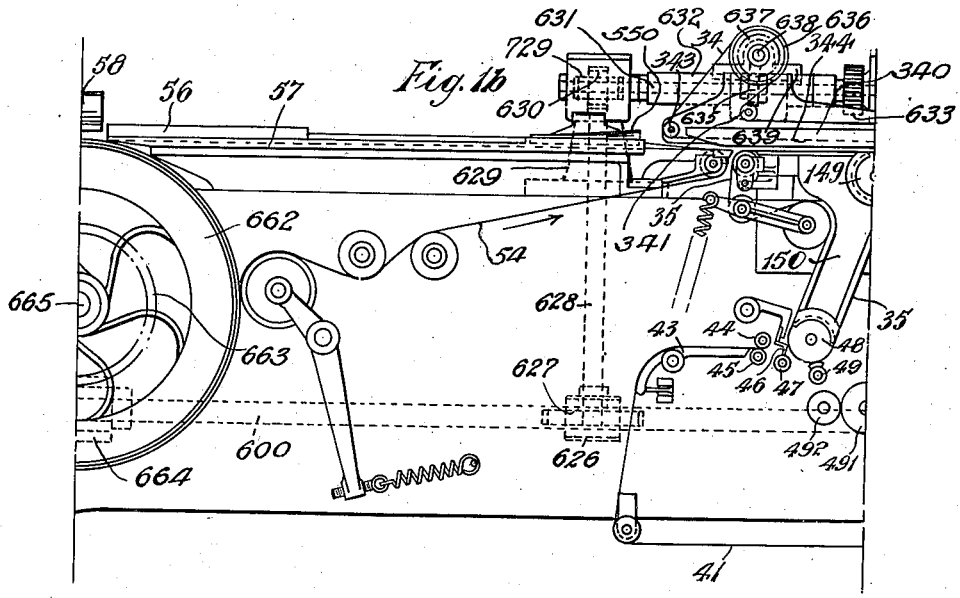
Figure 26:
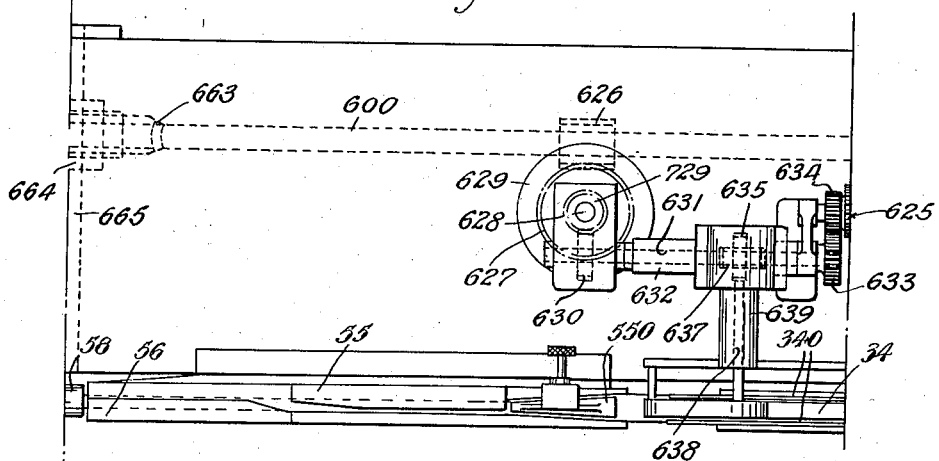

After the tip material 50 has been fed to the cigarettes and double length stubs, these latter are transferred to an endless tape 54 which moves at the same speed as the conveyors 34 and 35 and above which is provided folding mechanism in which a stationary folder 55 folds down one edge, for example, the edge 51 of the tip 50, and subsequently the stationary folder 56 folds down the other edge 52 of the tip material. A stationary tongue 550 shown in Figures 1b and 2b is placed above the cigarettes and stubs and serves to hold them in alignment until they enter the folding mechanism.

The lower portion 57 of the folding mechanism is of the usual type, and is shaped to the cross-sectional shape of the cigarettes and stubs. In this way the tip material is completely wrapped round and pressed to join the cigarettes and stub lengths. After leaving the folding mechanism the lengths of cigarettes and stubs joined by the wrapping material are passed below a known type of heater element 58 which dries the adhesive. After passing the heating element the joined cigarettes and stubs are passed to any known type of cut-off mechanism 59, such, for example, as that described in U. S. Patent No. 1,860,197, which severs the joined cigarettes and stubs at the stub portion and in the middle of the tips. Thus, the joined cigarettes and stubs, after leaving the heater 58, pass through a tube 591 and through both portions of a ledger 592, where they are severed by the aforesaid cut-off mechanism. The ledger 592 may be constructed in accordance with U. S. Patent No. 1,850,050. The cigarettes, as shown in Figures 9 to 11, are of such a length that they also are divided in the middle by the cut-off mechanism 59. After leaving the ledger 592, the cigarettes pass onto a band 595 which is moving at a faster speed than the cigarettes, in order to separate them endwise, and a spring band 593 cooperates with the band 595 to grip the cigarettes therebetween. The cigarettes, spaced apart, move into the field of action of a pair of deflectors 61, mounted on a spindle 594. The deflector mechanism may be constructed as shown in U. S. Patent No. 1,974,032, and operates to move the cigarettes onto a transversely travelling collector band 60.

In the example given the cigarettes and stubs were double the length required, and a composite endless rod was made which was cut in the usual manner on cigarette machines. It is not necessary, however, to employ a cutting device, since the apparatus could be arranged so that single length cigarettes and single length stubs were fed along the machine and tip material fed to secure a stub to one end only of each cigarette. In this way mouthpiece cigarettes can be produced while moving axially without the necessity of having to do any severing, (see Fig. 14).

Alternatively, two short lengths of cigarette could be fed down in pairs instead of a long length, and gaps left between each pair. The double length stubs could then be fed into the gaps and joined to the ends and the cigarettes adjacent to the stub (see Fig. 15). In this way it would merely be necessary to sever the stub.

In a still further modified form, instead of feeding short lengths of tip material, a continuous wrapper could be fed to form a complete tube around the cigarettes and stubs, the wrapping of the tube being effected in the normal manner in which it would be wrapped round an endless tobacco rod on a continuous cigarette making machine, in which case the wrapped composite rod would be severed in the middle of the stubs and cigarettes.

Figure 17:
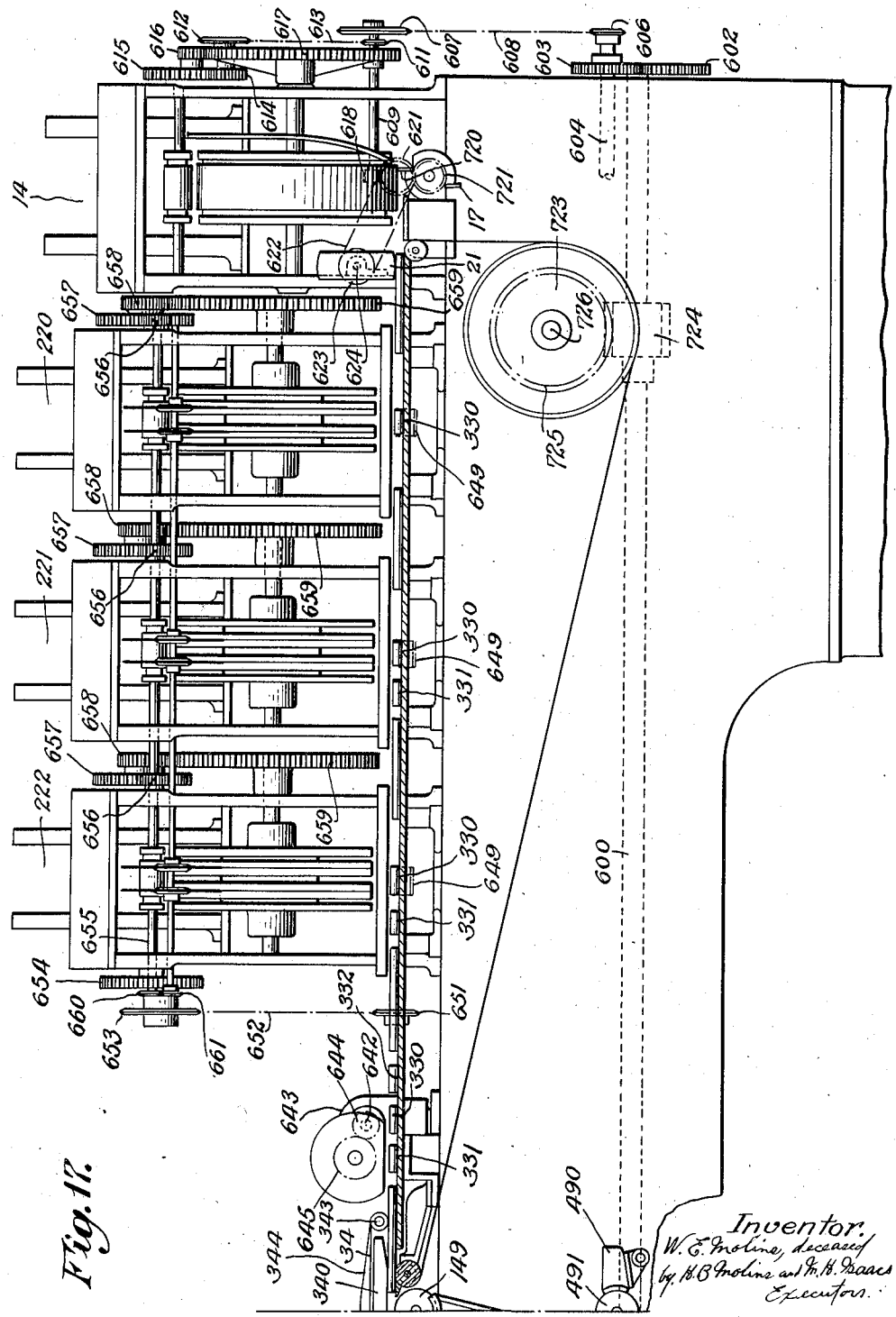
Figure 17 illustrates mechanism for feeding cigarette lengths and stub lengths in the case where cigarettes having composite stubs are to be formed.

Apparatus for performing this wrapping operation is illustrated in Figure 16. In this case feed rolls 44, 45 and severing apparatus (Fig. 1b) are omitted, and likewise suction box 150. The web of wrapping material 41' passes over the tape 35' and is fed to the cigarettes and stubs just as in the case of the severed wrapping pieces, and is wrapped about the several elements to form a continuous rod, in the manner well known in the art. When it is desired to manufacture cigarettes in which the stub forms a composite mouthpiece such as one comprising in part a length of cigarette rod and in part a piece of a filter material of short length or a short tube, the spaces between the cigarettes on the tape 20 are filled by a small filter plug or a paper tube, then followed by a short piece of cigarette rod, after which comes another small filter plug or a tube and then the next cigarette length. In such a case three stub feeds would be arranged in series, the several feeds being constructed as illustrated in Figure 1a and described above. Such an arrangement is illustrated in Figure 17, the shields 27 and 28 having been omitted, as in the case of Fig. 1a, for the sake of clarity. In the operation of the feeding mechanism there shown, the feed 220 first feeds a stub 330 into the space between two cigarettes. Thereafter the feed 221 feeds a stub 331, and the feed 222 supplies a stub 332. The several stub feeds 220, 221 and 222 may be timed to perform the above described operation in the sequence set forth, or in any other desired sequence. Thus the several stubs might be delivered in the reverse order to that set forth, or in such order as appears desirable.

The several elements are closed up on one another by the timing mechanism, as in the case of the apparatus illustrated in Figure 1a, and either a severed strip of wrapping material or a continuous wrapper is employed to join them, after which the rod thus formed is severed through the cigarette and through the stub member 330.

The wrapper is then wrapped round the ends of the cigarettes and encloses the constituents of the mouthpiece. Thereafter the composite article comprising the two lengths of cigarette joined to the elements between them is severed at a point between the two opposite ends of the cigarette lengths.

If the cigarettes are of double length, the cigarette may be cut in the middle of its length as well.

Figure 18:
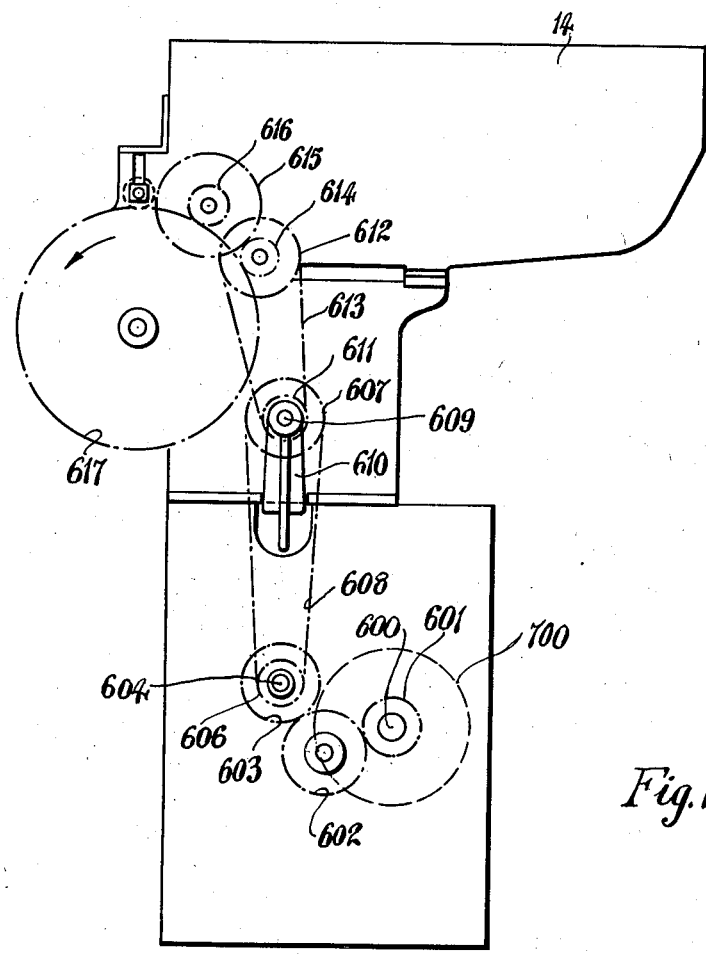
Figure 18 is an external view of the cigarette feeding hopper shown in Figure 3, illustrating the mechanism for driving the various parts.

From the foregoing it will be gathered that the various mechanisms comprising the machine are all driven in timed relationship and the gearing and other connections for effecting this will now be described. It is to be understood, however, that the driving mechanism to be described specifically forms no novel feature per se of the invention in this case. All motions are taken from a main shaft 600 which is carried in bearings in the interior of the machine and driven by a pulley 700 shown in broken lines in Figure 18, or by a motor. The drive for the cigarette hopper 14 illustrated in Figures 1a, 3 and 17 is best shown in Figures 17 and 18. The main shaft 600 has on its end a gear 601 which meshes with an idler 602 which drives a gear 603 carried on a shaft 604. A sprocket 606 fixed to the shaft 604 drives another sprocket 607 through a chain 608. The sprocket 607 is fixed to a small shaft 609 carried in a bearing 610 and other bearings in the hopper frame. A further sprocket 611 on the shaft 609 drives an upper sprocket 612 through a chain 613, and a gear 614 attached to the sprocket 612 drives a larger gear 615 which carries another and smaller gear wheel 616. The gear 616 engages with a large gear 617 which is fixed to the spindle of the fluted roller 15.

On the shaft 609 is also mounted a spiral gear 618 which engages with another 619 having a shaft 620, Figure 2a. The shaft 620 carries another spiral gear 720 which meshes with another 721 which is fixed to the shaft 18 which carries the vanes 17. In addition the shaft 620 carries a sprocket 621 connected by a chain 622 to another sprocket 623. The latter is mounted on a shaft 624 which carries the rotating feed member 21 at its other end.

A countershaft 625, Figures 1a and 2a, is mounted in bearings on the top of the machine bed and serves to drive the stub hopper gear and associated parts and also the timing fingers 39 and the tape 34. The shaft 625 receives its motion from the main shaft 600 which carries a worm 626 engaging a worm wheel 627, see Figures 1b and 16. The worm wheel is fixed at the foot of a vertical shaft 628 carried in a bearing 629 on the bed of the machine, see Figure 2b. At the top of the shaft 628 is a spiral gear 729 which engages with another 630 on a shaft 631 supported in a bearing 632. This shaft carries a gear 633 at its other end engaging another 634, Figure 2b, which is fixed to the countershaft 625. The shaft 631 also has a spiral gear 635 on it engaging another 637 which is fixed to a shaft 638. The shaft 638 is mounted in a bearing 639 and has fixed at its outer end the pulley 636 which drives the tape 34.

From Figures 1a and 2a it will be seen that the countershaft 625 also has a spiral gear 640 fixed on it which engages with another 641 fixed on a shaft 642. This shaft is mounted in bearings 643 and has a gear 644 at its other end. The gear 644 meshes with a gear 645 which is attached to the spindle of the drum 37 carrying the timing fingers 39, see also Figure 8. A little further along the countershaft 625, Figure 2a, is a gear 646 which engages another gear 647 mounted on a shaft 648 journalled in the housing of the conveyor 30. The shaft 648 carries a worm 649 engaging a worm wheel 650 fitted to the spindle of the conveyor 30. At a point on the countershaft 625 between the conveyor drive gears and the timer drive gears is a sprocket 651 from which a chain 652 drives a sprocket 653 on the stub feeding apparatus.

The spindle of the sprocket 653 has a small gear on it which is not visible in Figure 1a, and the small gear engages a larger gear 654 on a spindle 655 which passes across the frames of the stub feed and carries another gear 656 on its end. The gear 656 engages a larger gear 657 to which is attached a smaller gear 658 which meshes with the large gear 659 fixed on the spindle of the fluted drum 23.

A sprocket 660 attached to the sprocket 653 drives another sprocket 661 through a chain, the sprocket 661 being fixed to the spindle of the knife discs 24.

In Figure 17 the arrangements are similar to those described with reference to Figure 1a, except that the spindle 655 is extended across the three sets of stub hopper frames and the spindle of the knife discs 24 is similarly extended.

The tape 54 which conveys the cigarettes and stubs through the folding mechanism is driven by a tape drum 662, Figures 1b, 1c and 16. The spindle 665 of this drum has a worm wheel 663 fixed to it which engages a worm 664 mounted on the main shaft 600.

Figure 20:
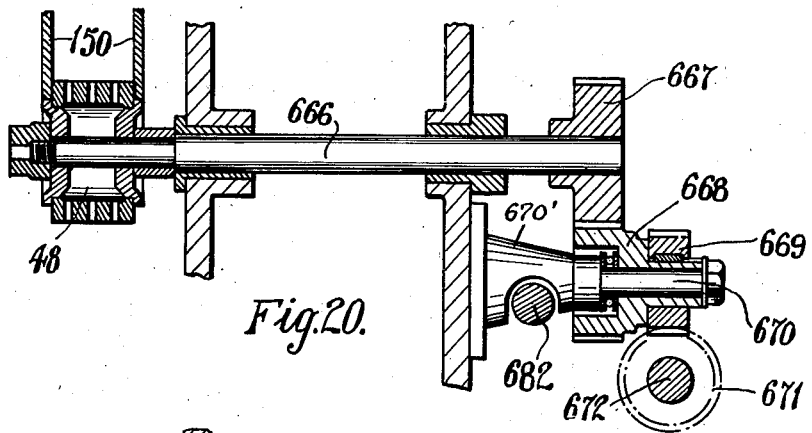
Figure 20 is a section of Figure 19 on the line X—X.

Referring to Figures 19, 20, 21, 22 and also to Figures 1b and 6, the roller 48 which drives the tape 35 is fixed to a spindle 666, Figure 20, which has a gear 667 on its other end. This gear engages with another 668 fixed to a spiral gear 669 both of which run on a fixed spindle 670. The spindle 670 is provided with a conical portion 670' which is fixed to the machine. The conical portion 670' is cut away as shown in Figure 20 in order to permit a shaft 682 referred to later to extend along this part of the machine. It will be appreciated that it is because of the nearness of the centers of the spindle 670 and shaft 682 that it is necessary to provide a cut away portion. To give rigidity to the cut away portion extra metal is employed by providing the conical part 670'. The gear 669 engages with another spiral 671 fixed to a shaft 672. The shaft 672 has a large gear 673 fixed to its end, see Figures 19 and 22, which engages another gear 674, the latter being in mesh with a gear 675 on the main shaft 600. The roller 149 is driven by a chain (not shown) from the roller 48 so that the two rollers run at the same speed and no needless work is thrown on to the tape 35.

Figure 21:
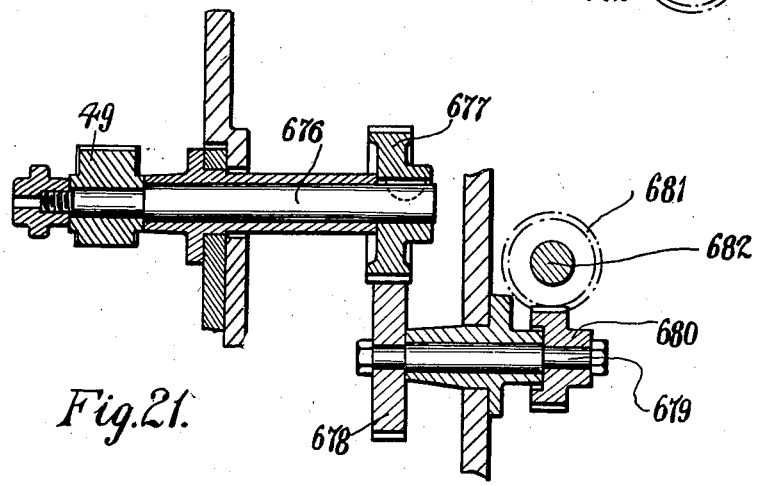
Figure 21 is a section of Figure 19 on the line Y—Y.

The gumming roller 49 is mounted on a spindle 676, Figure 21, which carries a gear 677 at its other end. Owing to the particular design of the machine the spindle 676 is nearly co-axial with the spindle 670 and consequently in Figure 19 the gum roller 49 appears to be on the spindle 670, but it should be clearly understood that the gum roller and its spindle and the gear 677 are behind the spindle 670 and its associated parts and have no connection therewith. This gear engages a gear 678 on a spindle 679 which also carries a spiral gear 680 at its other end. The gear 680 meshes with another spiral gear 681 on a shaft 682, Figures 19 and 21. At one end the shaft 682 is fitted with a coupling disc 683 which is connected to another 684 by a driving pin 685. The disc 684 is fixed to a shaft 686 which is geared to the main shaft, and the coupling discs are provided to enable the drive to be disconnected at times during the setting up of the machine and recoupled without having to reset the parts in the proper timed relationship.

The gum furnishing roller 492 is driven by friction from the roller 491. The latter carries a gear 687 meshing with another 688 on a spindle 689. This spindle also carries a spiral gear 690 which engages with another spiral 691 on the shaft 672. The driving roller 44 and the rotating knife 47 are coupled by gears 692 and 693, the latter being on a spindle 694 which carries a spiral gear 695 engaging another spiral 696 on the shaft 682.

Referring to Figures 1c and 2c, the cut-off mechanism and the band 595 and associated parts are driven in the following manner. The end of the shaft 600 carries a gear 697 which drives an idler 698 which meshes with a gear 699 on a small countershaft 701, Figure 1c. A spiral gear 702 on the countershaft drives another spiral 703 at right angles to it, which in turn drives another 704 fixed on the shaft 705 of the cut-off mechanism. The spindle of the gear 703 carries the crank pin which operates the ledger as described in the United States patent previously referred to. A small gear 706, Figure 1c, on the spindle of the spiral 703 engages with a larger gear 707 which is on a spindle 708, the latter also carrying a sprocket 709. A chain 710 on this sprocket drives a sprocket 711 on a spindle having a worm 712 fixed to it. The worm engages a worm wheel 713 on the spindle 714 of the roller which drives the collector band 60. A further chain 715 connects the spindle of the worm 712 to the spindle of a spiral gear 716. This gear engages another 717 on the deflector shaft 594.

The tape 595 is driven by a small tape drum 718 on the spindle of which is mounted a gear 719 which engages with the gear 707.

The spring band conveyor 593 is driven by a chain 722 from a sprocket on the spindle of the worm 712.

The tape 20 is driven by a tape drum 723 which is rotated by gearing from the main shaft 600 at such a speed that the tape 20 travels faster than the tape 54. The gearing comprises a worm 724 on the shaft 600 engaging a worm wheel 725 on the shaft 726 of the tape drum 723 (see Figure 1a).

It will be appreciated that the various mechanisms described and illustrated herein may be used in analogous relations, to perform the same or similar functions. For example, the apparatus for feeding, severing and applying the wrapping or tipping material may be used in connection with machines for making tipped cigarettes generally, whether the tips are to be applied to previously wrapped cigarette elements or to a web of wrapping material in the usual way.

What I claim as my invention and desire to secure by Letters Patent is:

1. A method of manufacturing mouthpiece cigarettes which comprises feeding a cigarette rod section and a stub section in substantial axial alignment in a generally axial direction, and concurrently applying and securing a wrapper to said sections to unite the same.

2. A method of manufacturing mouthpiece cigarettes which comprises feeding two spaced cigarette rod sections and an intermediate stub section of double length in substantial axial alignment in a generally axial direction, concurrently applying and securing a wrapper to said sections to unite the same, and thereafter severing said wrapper and stub section intermediate the ends of the latter.

3. A method of manufacturing mouthpiece cigarettes which comprises feeding two spaced cigarette rod sections of twice normal cigarette length and an intermediate stub section of double length in substantial axial alignment in a generally axial direction, concurrently applying and securing a wrapper to said sections to unite the same, and thereafter severing said wrapper and stub section intermediate the ends of the latter and severing said cigarette sections substantially mid-way between the ends of the latter.

4. Apparatus for manufacturing mouthpiece cigarettes, comprising means for feeding cigarettes and stubs so that they are brought into axial alignment, means for moving the axially aligned cigarettes and stubs in an axial direction, means for feeding wrapping material into contact with the stubs and cigarettes, and means for wrapping the said wrapping material around the stubs and the cigarettes and securing the wrapping material to unite the stubs and cigarettes while they are moving axially.

5. In apparatus for manufacturing mouthpiece cigarettes, the combination with means for feeding two spaced cigarette rod sections and an intermediate stub section of double length in substantial axial alignment in a generally axial direction, of means for applying and securing to said sections during feeding thereof a wrapper to unite the same, and means for thereafter severing the stub section approximately mid-way of the ends of the latter.

6. In apparatus for manufacturing mouthpiece cigarettes, the combination with means for feeding two spaced cigarette rod sections of twice normal length and an intermediate stub section of double length in substantial axial alignment in a generally axial direction, of means for applying and securing to said sections during feeding thereof a wrapper to unite the same, and means for thereafter severing the stub section approximately mid-way of the ends of the latter and for severing the cigarette sections approximately mid-way of the ends of the latter.

7. In apparatus for manufacturing mouthpiece cigarettes, the combination with a movable conveyor, of means for feeding cigarette rod sections onto said conveyor in axially spaced relation and with their axes arranged in the direction of movement of the conveyor, and means for introducing stub sections intermediate said cigarette rod sections in substantial axial alignment with the latter while the said cigarette rod sections are moving axially.

8. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operable in timed relation with and during movement of said conveyor for applying and securing wrappers to adjacent stud and cigarette rod sections to unite the same.

9. In apparatus for manufacturing mouthpiece cigarettes, the combination with a conveyor, of means for feeding cigarette rod sections onto said conveyor in axially spaced relation for movement with said conveyor in a direction generally axial of said sections, means for introducing stub sections intermediate said cigarette rod sections in substantial axial alignment with the latter, and means operable in timed relation with and during movement of said conveyor for applying and securing wrappers to adjacent stub and cigarette rod sections to unite the same.

10. In apparatus for manufacturing mouthpiece cigarettes, the combination with a conveyor, of means for feeding cigarette rod sections onto said conveyor in axially spaced relation and with their axes lying in the general direction of movement of said conveyor, and means for introducing stud sections intermediate said cigarette rod sections in substantial axial alignment with the latter, said last named means having an element serving to impart to said stub sections a component of movement in the direction of travel of said conveyor at the instant of delivery thereof to the conveyor.

11. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter and in spaced relation thereto, and means for thereafter effecting relative displacement of said sections in an axial direction to reduce the spacing therebetween.

12. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter and in spaced relation thereto, and means for thereafter effecting relative displacement of said sections in an axial direction to reduce the spacing therebetween, said last named means including a second conveyor movable at a slower linear speed than that of said first conveyor and receiving said sections from the latter.

13. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter and in spaced relation thereto, means for thereafter effecting relative displacement of said sections in an axial direction to reduce the spacing therebetween, said last named means including a second conveyor movable at a slower linear speed than that of said first conveyor and receiving said sections from the latter, and means for thereafter applying and securing a wrapper to certain adjacent sections.

14. In apparatus for manufacturing mouthpiece cigarettes, the combination with a conveyor, means for delivering cigarette rod sections in substantial axial alignment on said conveyor for movement with the latter in a generally axial direction, and a second conveyor receiving said sections from said first conveyor for movement therewith in a generally axial direction, said second conveyor being operable at a different linear speed than that of said first conveyor for controlling the axial spacing of said sections, and means for introducing stub sections on said first conveyor intermediate said cigarette rod sections and in substantial axial alignment with the latter.

15. In apparatus for manufacturing mouthpiece cigarettes, the combination with a conveyor, means for delivering cigarette rod sections in substantial axial alignment on said conveyor for movement with the latter in a generally axial direction, and a second conveyor receiving said sections from said first conveyor for movement therewith in a generally axial direction, said second conveyor being operable at a different linear speed than that of said first conveyor for controlling the axial spacing of said sections, means for introducing stub sections on said first conveyor intermediate said cigarette rod sections and in substantial axial alignment with the latter, and means for applying and securing wrapping material to said sections on said second conveyor and during axial movement thereof to unite the same.

16. In apparatus for manufacturing mouthpiece cigarettes, the combination with a conveyor for feeding cigarette rod sections and stub sections in a generally axial direction in axial alignment, of means for introducing wrappers between said conveyor and said sections in overlapping relation with contiguous ends of said sections.

17. In apparatus for manufacturing mouthpiece cigarettes, the combination with a conveyor for feeding cigarette rod sections and stub sections in a generally axial direction in axial alignment, of means for introducing wrappers between said conveyor and said sections in overlapping relation with contiguous ends of said sections, said means including a device for applying suction to said conveyor to retain said wrappers thereon as the wrappers are moved into contact with said sections.

18. In apparatus for manufacturing mouthpiece cigarettes, the combination with a conveyor for feeding cigarette rod sections and stub sections in a generally axial direction in axial alignment, of means for introducing wrappers between said conveyor and said sections in overlapping relation with contiguous ends of said sections, said means including a device for applying suction to said conveyor to retain said wrappers thereon as the wrappers are moved into contact with said sections, and means for applying adhesive to said wrappers while the latter are retained on said conveyor.

19. In apparatus for manufacturing mouthpiece cigarettes, the combination with a conveyor for feeding cigarette rod sections and stub sections in a generally axial direction in axial alignment, said conveyor comprising a continuous flexible belt, of means for delivering said sections onto said conveyor, and means for introducing wrapping material beneath said sections and on said conveyor, said last named means including a suction box associated with said conveyor for retaining said wrapping material thereon at points on said conveyor in advance of the point of delivery of the sections to the conveyor.

20. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operable to engage certain of said sections and impart thereto an added movement in the direction of feed thereof to regulate the axial relationship between the sections.

21. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operable to engage certain of said sections and impart thereto an added movement in the direction of feed thereof to regulate the axial relationship between the sections, said last named means including a rotating member, and at least one section engaging element carried by said member, and means for retaining said element against angular displacement with respect to the axes of said sections during engagement therewith.

22. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, means operable to engage certain of said sections and impart thereto an added movement in the direction of feed thereof to regulate the axial relationship between the sections, and means operable in timed relation with and during movement of said conveyor for applying and securing wrappers to adjacent stub and cigarette rod sections to unite them.

23. Apparatus for manufacturing mouthpiece cigarettes, comprising a magazine for a supply of cigarettes, a magazine for a supply of stubs, means to receive cigarettes and stubs from said magazines and to move the cigarettes and stubs so that they are brought into axial alignment, means for moving the axially aligned cigarettes and stubs in an axial direction, means for feeding wrapping material into contact with the stubs and cigarettes, and means for wrapping the said wrapping material around the stubs and the cigarettes and securing the wrapping material to unite the stubs and cigarettes while they are moving axially.

24. Apparatus for manufacturing mouthpiece cigarettes, comprising a magazine for a supply of cigarettes, a magazine for a supply of multi-length stubs, means for severing the multi-length stubs to stubs of desired lengths, means to receive cigarettes and stubs from said magazines and to move the cigarettes and stubs so that they are brought into axial alignment, means for moving the axially aligned cigarettes and stubs in an axial direction, means for feeding wrapping material into contact with the stubs and cigarettes, and means for wrapping the said wrapping material around the stubs and the cigarettes and securing the wrapping material to unite the stubs and cigarettes while they are moving axially.

25. In apparatus for manufacturing mouthpiece cigarettes, the combination with a conveyor, of a magazine for a supply of wrapped cigarette rod sections, a magazine for a supply of stubs, means for feeding wrapped cigarette rod sections from said magazine onto said conveyor in axially spaced relation and with their axes lying in the general direction of movement of said conveyor, and means for feeding stub sections from said stub magazine and for introducing said stub sections intermediate said cigarette rod sections in substantial axial alignment with the latter.

26. In apparatus for manufacturing mouthpiece cigarettes, the combination with a conveyor, of a magazine for a supply of wrapped cigarette rod sections, a magazine for a supply of stubs of multiple length, means for feeding wrapped cigarette rod sections from said magazine onto said conveyor in axially spaced relation, means for severing the multiple length stubs into stub sections of desired length, and means for feeding the said stub sections from said stub magazine and for introducing said stub sections intermediate said cigarette rod sections in substantial axial alignment with the latter.

27. In apparatus for manufacturing mouthpiece cigarettes, the combination with a conveyor, of a magazine for a supply of wrapped cigarette rod sections, a magazine for a supply of stubs, means for feeding wrapped cigarette rod sections onto said conveyor in axially spaced relation and with their axes lying in the general direction of movement of said conveyor, means for feeding stub sections from said stub magazine, means for introducing stub sections intermediate said cigarette rod sections in substantial axial alignment with the latter, and means operable in timed relation with and during movement of said conveyor for applying and securing wrappers to adjacent stub and cigarette rod sections to unite the same.

28. In apparatus for manufacturing mouthpiece cigarettes, the combination with a conveyor, of a magazine for a supply of wrapped cigarette rod sections, a magazine for a supply of multi-length stubs, means for feeding wrapped cigarette rod sections onto said conveyor in axially spaced relation, means for severing the multi-length stubs into stub sections of the desired length, means for feeding the said stub sections from the said stub magazine, means for introducing stub sections intermediate said cigarette rod sections in substantial axial alignment with the latter, and means operable in timed relation with and during movement of said conveyor for applying and securing wrappers to adjacent stub and cigarette rod sections to unite the same.

29. In apparatus for manufacturing mouthpiece cigarettes, the combination with a conveyor, of a magazine for a supply of wrapped cigarette rod sections, a magazine for a supply of stubs, means for feeding wrapped cigarette rod sections from the said magazine containing them onto said conveyor in axial spaced relation for movement with said conveyor in a direction generally axial of said sections, means for feeding stub sections from the said magazine containing the stub sections and introducing the stub sections intermediate said cigarette rod sections in substantial alignment with the latter, and means operable in timed relation with and during movement of said conveyor for applying and securing wrapping material to adjacent stub and cigarette rod sections to unite the same.

30. In apparatus for manufacturing mouthpiece cigarettes, the combination with a conveyor, of a magazine for a supply of wrapped cigarette rod sections, a magazine for a supply of multi-length stubs, means for feeding wrapped cigarette rod sections from the magazine onto said conveyor in axial spaced relation for movement with said conveyor in a direction generally axial of said sections, means for severing the multi-length stubs into stub sections of desired length, means for introducing the said stub sections intermediate said cigarette rod sections in substantial alignment with the latter, and means operable in timed relation with and during movement of said conveyor for applying and securing wrapping material to adjacent stub and cigarette rod sections to unite the same.

31. In apparatus for manufacturing mouthpiece cigarettes, the combination with a conveyor, of a magazine for a supply of wrapped cigarette rod sections, a magazine for a supply of stubs, means for feeding wrapped cigarette rod sections from the said magazine containing them onto said conveyor in axial spaced relation for movement with said conveyor in a direction generally axial of said sections, means for feeding stub sections from the said magazine containing the stub sections and introducing the stub sections intermediate said cigarette rod sections in substantial alignment with the latter, and means operable in timed relation with and during movement of said conveyor for applying and securing severed lengths of wrapping material to adjacent stub and cigarette rod sections to unite the same.

32. In apparatus for manufacturing mouthpiece cigarettes, the combination with a conveyor, of a magazine for a supply of wrapped cigarette rod sections, a magazine for a supply of multi-length stubs, means for feeding wrapped cigarette rod sections from the magazine onto said conveyor in axial spaced relation for movement with said conveyor in a direction generally axial of said sections, means for severing the multi-length stubs into stub sections of desired length, means for introducing the said stub sections intermediate said cigarette rod sections in substantial alignment with the latter, and means operable in timed relation with and during movement of said conveyor for applying and securing severed lengths of wrapping material to adjacent stub and cigarette rod sections to unite the same.

33. In apparatus for manufacturing mouthpiece cigarettes, the combination with a conveyor for feeding wrapped cigarette rod sections and stub sections in a generally axial direction, of a magazine for a supply of wrapped cigarette rod sections, a magazine for stub sections, means for feeding cigarette sections and stub sections onto said conveyor from the said magazines, and means for introducing wrappers between said conveyor and said sections in overlapping relation with adjacent ends of said cigarette rod and stub sections, said means including a device for applying suction to said conveyor to retain said wrappers thereon as the wrappers are moved into contact with the said sections.

34. In apparatus for manufacturing mouthpiece cigarettes, the combination with a conveyor for feeding wrapped cigarette rod sections and stub sections in a generally axial direction in axial alignment, of a magazine for a supply of wrapped cigarette rod sections, means for feeding cigarette rod sections onto said conveyor at spaced intervals thereon, a magazine for a supply of multi-length stubs, means for severing said multi-length stubs into sections of desired lengths, means for feeding the severed stub sections to said conveyor between adjacent cigarettes, and means for introducing wrappers between said conveyor and adjacent stub and cigarette sections in overlapping relation with adjacent ends of said cigarette rod and stub sections, said means including a device for applying suction to said conveyor to retain said wrappers thereon as the wrappers are moved into contact with said sections.

35. Apparatus for manufacturing mouthpiece cigarettes comprising in combination a magazine for a supply of wrapped cigarette rod sections, a magazine for a supply of multi-length stubs, a conveyor device, means for feeding cigarette rod sections onto said conveyor at spaced intervals thereon, means to sever the multi-length stubs into stub lengths of desired length, means for feeding said stub sections between adjacent wrapped cigarette rod sections on said conveyor, said conveyor being arranged to feed the wrapped cigarette rod sections and stud sections in axial alignment, a furthe conveyor device onto which the said wrapped cigarette rod and stub sections are fed in axial alignment, means including a suction device for feeding severed lengths of wrapping material between said further conveyor device and adjacent wrapped cigarette rod and stub sections, and means for securing said severed lengths of wrapping material to adjacent cigarette and stub sections to unite them while they are moving axially.

36. In apparatus for manufacturing mouthpiece cigarettes, the combination with a conveyor, of means for feeding cigarette rod sections onto said conveyor in axially spaced relation, means for introducing stub sections intermediate said cigarette rod sections in substantial axial alignment with the latter and in spaced relation thereto, means for thereafter effecting relative displacement of said sections in an axial direction to reduce the spacing therebetween, said last named means including a second conveyor movable at a slower linear speed than that of said first conveyor and receiving said sections from the latter, and movable means positively engaging certain of said sections to deliver the same to said second conveyor in predetermined axial relation.

37. In apparatus for manufacturing mouthpiece cigarettes, the combination with a conveyor, of means for feeding cigarette rod sections onto said conveyor in axially spaced relation, means for introducing stub sections intermediate said cigarette rod sections in substantial axial alignment with the latter and in spaced relation thereto, means for thereafter effecting relative displacement of said sections in an axial direction to reduce the spacing therebetween, said last named means including a second conveyor movable at a slower linear speed than that of said first conveyor and receiving said sections from the latter, and movable means positively engaging certain of said sections to deliver the same to said second conveyor in predetermined axial relation, said movable means including a member displaceable, during engagement with said sections, in the direction of movement of said second conveyor and at a speed greater than the linear speed of said second conveyor.

38. In apparatus for manufacturing mouthpiece cigarettes, the combination with a conveyor, of means for feeding cigarette rod sections onto said conveyor in axially spaced relation, means for introducing stub sections intermediate said cigarette rod sections in substantial axial alignment with the latter and in spaced relation thereto, means for thereafter effecting relative displacement of said sections in an axial direction to reduce the spacing therebetween, said last named means including a second conveyor movable at a slower linear speed than that of said first conveyor and receiving said sections from the latter, movable means positively engaging certain of said sections to deliver the same to said second conveyor in predetermined axial relation, means for applying a wrapper to said sections to unite the same, and means operable in timed relation with said movable means for severing certain of said wrapped sections at predetermined points intermediate the ends of such sections.

39. In apparatus for manufacturing mouthpiece cigarettes, the combination with a first conveyor for feeding cigarette rod sections and cigarette stub sections in substantial axial alignment and spaced relation in a predetermined path, of a second conveyor receiving said sections from said first conveyor and feeding the same at a less linear speed, whereby the spacing between said sections is reduced, and movable means positively engaging certain of said sections and delivering the same to said second conveyor in accurate, predetermined axial relation.

40. In apparatus for manufacturing mouthpiece cigarettes, the combination with a first conveyor for feeding cigarette rod sections and cigarette stub sections in substantial axial alignment and spaced relation in a predetermined path, of a second conveyor receiving said sections from said first conveyor and feeding the same at a less linear speed, whereby the spacing between said sections is reduced, movable means positively engaging certain of said sections and delivering the same to said second conveyor in accurate, predetermined axial relation, means for wrapping adjacent sections to unite the same, and means operating in timed relation to said movable means for severing said wrapped sections, whereby severance of said wrapped sections at accurately determined points may be effected.

41. In a method of manufacturing mouthpiece cigarettes, the steps which comprise feeding stub sections and cigarette rod sections in axially spaced relation in a predetermined path, reducing the speed of feeding of said sections at a given point in said path to reduce the spacing therebetween, and positively controlling the axial relationship between certain of said sections at the point of reduction in the speed of feeding thereof.

42. In apparatus for manufacturing mouthpiece cigarettes, the combination with a conveyor, of means for feeding wrapped cigarette rod sections onto said conveyor in axially spaced relation and with their axes lying in the general direction of movement of said conveyor, means for introducing stub sections intermediate said cigarette rod sections in substantial axial alignment with the latter, and means operable to engage the end faces of certain of said sections to ensure the positioning of the sections in desired axially abutting relationship.

43. In apparatus for manufacturing mouthpiece cigarettes, the combination with a conveyor for feeding wrapped cigarette rod sections and stub sections in axial alignment, means for applying wrapping material around the aligned sections as they are moving axially to form a continuous composite rod, means to sever the composite rod into sections, each section containing a tobacco portion at one end and a stub portion at the other end, and means operable to positively engage and axially displace certain of said sections with respect to the remainder before being wrapped to ensure the positioning of the sections in desired axial abutting relationship.

44. In a method of manufacturing mouthpiece cigarettes, the steps which comprise feeding stub sections and cigarette rod sections in axial alignment in a predetermined path, positively engaging certain of said sections and displacing the same axially with respect to the remaining sections to establish a definite axial relation therebetween, and thereafter applying and securing a wrapper about said sections to form an elongated rod while continuing the axial feeding thereof, and severing the moving rod into lengths.

45. In apparatus for manufacturing mouthpiece cigarettes, the combination with a conveyor, of means for feeding wrapped cigarette rod sections onto said conveyor in axially spaced relation, means for introducing stub sections intermediate said cigarette rod sections in substantial axial alignment with the latter, devices operable to engage the end faces of certain of said sections to alter the rate of axial feeding thereof, means for applying a wrapper about said sections to form a rod, and means for severing the rod into lengths, said devices and said last named means being operable in such timed relation as to ensure the severing of the rod at points having a predetermined relation to the ends of the sections.

46. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operating in timed relation with said conveyor for feeding wrapping material into engagement with and wrapping it about said cigarette rod sections and stubs and securing said wrapping material to said cigarette rod sections.

47. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operating in timed relation with said conveyor for feeding wrapping material into engagement with and wrapping it about said cigarette rod sections and stubs and securing said wrapping material to said stubs.

48. In apparatus for manufacturing mouthpiece cigarettes, the combination with a conveyor, of means for feeding cigarette rod sections onto said conveyor in axially spaced relation and with their axes lying in the general direction of movement of said conveyor, means for introducing stub sections intermediate said cigarette rod sections in substantial axial alignment with the latter, and means operating in timed relation with said conveyor for feeding wrapping material into engagement with and wrapping it about said cigarette rod sections and stubs and securing said wrapping material to said cigarette rod sections and stubs.

49. In a method of manufacturing mouthpiece cigarettes, the steps of feeding cigarette rod sections and stubs axially and in substantial axial alignment and abutting relationship, feeding wrapping material into engagement with and wrapping it about said axially advancing cigarette rod sections and stubs, and securing said wrapping material to said cigarette rod sections.

50. In a method of manufacturing mouthpiece cigarettes, the steps of feeding cigarette rod sections and stubs axially and in substantial axial alignment and abutting relationship, feeding wrapping material into engagement with and wrapping it about said axially advancing cigarette rod sections and stubs, and securing said wrapping material to said stubs.

51. In a method of manufacturing mouthpiece cigarettes, the steps of feeding cigarette rod sections and stubs axially and in substantial axial alignment and abutting relationship, feeding wrapping material into engagement with and wrapping it about said axially advancing cigarette rod sections and stubs, and securing said wrapping material to said cigarette rod sections and stubs.

52. In apparatus for manufacturing mouthpiece cigarettes the combination with a conveyor, of means for feeding wrapped cigarette rod sections on to said conveyor in axially spaced relationship, means for introducing stub sections intermediate said cigarette sections in substantially axial alignment with the latter, devices operable to engage the end faces of certain of said sections to alter the rate of axial feeding thereof, wrapper feeding means for feeding short lengths of wrapping material to adjacent ends of the axially moving cigarette rod sections and stub sections and to apply said short lengths of wrapping material to the said sections to unite them while they are moving axially, and severing means for severing the united sections, said devices and said wrapper feeding means and said severing means being operable in such timed relation as to ensure that the short lengths of wrapping material are applied, and that the severing of the united sections takes place, at points having a predetermined relation to the ends of the sections.

53. In apparatus for manufacturing mouthpiece cigarettes, a conveyor, means to feed wrapped cigarette rod sections on to said conveyor in axially spaced relationship and with their axes lying in the general direction of movement of the conveyor, means for introducing stub sections intermediate said cigarette sections in substantially axial alignment with the latter, wrapper feeding means to feed short lengths of wrapping material to adjacent ends of the axially moving cigarette rod sections and stub sections and folding means to fold the wrapping material around said sections to unite them while they are moving axially, said wrapper feeding means including an endless band to move said sections together with the wrapping material axially towards said folding means and a suction device to retain the short lengths of wrapping material in position relatively to each other and to said endless band until the wrapping material is fed into position to engage adjacent ends of said axially moving sections.

54. A method of producing composite cigarettes which consists in assembling lengths of insertion in line with cigarettes or lengths of cigarette rod and uniting the assembled lengths by applying bands of material thereto while moving axially.

55. A method of producing composite cigarettes which consists in assembling lengths of insertion in line with cigarettes or lengths of cigarette rod and uniting the assembled lengths by applying bands of material thereto while moving axially, wherein double lengths of insertion are assembled so as to alternate with double lengths of cigarette rod, and wherein the lengths are united by the application of external bands to produce a continuous composite rod which is subsequently cut so as to bisect the lengths of cigarette rod and the lengths of insertion.

56. A method of producing composite cigarettes which consists in assembling lengths of insertion in line with cigarettes or lengths of cigarette rod and uniting the assembled lengths by applying bands of material thereto while moving axially, wherein cigarettes or single lengths of cigarette rod and single lengths of insertion are united in pairs by the application of external bands of material while the assembled lengths are moving axially.

57. A method of producing composite cigarettes which consists in assembling lengths of insertion in line with cigarettes or lengths of cigarette rod and uniting the assembled lengths by applying bands of material thereto while moving axially, wherein cigarettes or single lengths of cigarette rod and single lengths of insertion are assembled and united by bands of external tipping material in such manner as to produce a continuous composite rod which is subsequently cut off to produce cigarettes each containing a length of insertion at an intermediate position in its length.

58. A method of producing composite cigarettes which consists in assembling lengths of insertion in line with cigarettes or lengths of cigarette rod and uniting the assembled lengths by applying bands of material thereto while moving axially, wherein double lengths of insertion are assembled between pairs of cigarettes or of single lengths of cigarette rod and united thereto by the application of external bands of tipping material, the double length of insertion being subsequently bisected to produce cigarettes having mouthpiece insertions.

59. Apparatus for the production of composite cigarettes, comprising means adapted to assemble lengths of insertion in line with cigarettes or lengths of cigarette rod, and mechanism arranged to apply bands of material to unite the assembled lengths while moving axially.

60. Apparatus for the production of composite cigarettes, comprising means for feeding cigarettes or lengths of cigarette rod in a continuous stream, means adapted to accelerate the lengths in such manner as to form intermediate spaces at a predetermined position, means adapted to transfer lengths of insertion into the said spaces to effect the assembly of the lengths in line, and external tip-applying mechanism arranged to unite the assembled lengths by the application of uniting bands after said lengths have been butted together.

61. A method of producing composite cigarettes, comprising feeding cigarettes or lengths of cigarette rod and multiple lengths of insertion to an assembling zone, subdividing the multiple lengths of insertion while being fed to said zone, assembling the subdivided lengths of insertion in line with the cigarettes or lengths of cigarette rod, and uniting the assembled lengths by applying bands of material thereto while moving axially.

62. A method of producing composite cigarettes, comprising forming a stream of cigarettes or lengths of cigarette rod in axial alignment, feeding multiple lengths of insertion toward said stream, subdividing said multiple lengths of insertion while being fed to said stream, interposing the subdivided lengths of insertion between lengths of cigarette rod in said stream to assemble said lengths, and uniting the assembled lengths by applying bands of material thereto while moving axially.

63. A method of producing composite cigarettes, comprising feeding cigarettes or lengths of cigarette rod to an assembling zone, positioning multiple lengths of insertion on a conveyor, subdividing the multiple lengths of insertion while on said conveyor, transferring the severed lengths to a second conveyor for carrying them to the assembling zone, assembling the subdivided lengths of insertion in line with the cigarettes or lengths of cigarette rod, and uniting the assembled lengths by applying bands of material thereto while moving axially.

64. A method of producing composite cigarettes, comprising feeding cigarettes or lengths of cigarette rod to an assembling zone, positioning multiple lengths of insertion on a conveyor, subdividing the multiple lengths of insertion while on said conveyor, transferring the severed lengths intermittently one by one to a second conveyor for carrying them to the assembling zone, assembling the subdivided lengths of insertion in line with the cigarettes or lengths of cigarette rod, and uniting the assembled lengths by applying bands of material thereto while moving axially.

65. Apparatus for the production of composite cigarettes, comprising means adapted to assemble lengths of insertion in line with cigarettes or lengths of cigarette rod, mechanism arranged to apply bands of material to unite the assembled lengths while moving axially, a transfer member for transferring multiple length insertions to said assembling means, and means for subdividing the multiple length insertions while on said transfer member.

66. A method of producing composite cigarettes, comprising feeding cigarettes or lengths of cigarette rod in a continuous stream, accelerating the cigarettes or lengths of cigarette rod to form spaces therebetween, assembling insertions in said spaces in line with the cigarettes or lengths of cigarette rod, causing the cigarettes or lengths of cigarette rod to butt against the insertions, continuing the forward travel of the assembled lengths butted one against the other, and applying bands of material to said lengths during the forward travel thereof to unite said lengths.

WALTER EVERETT MOLINS.